US012620703B2

(12) United States Patent
Geng et al.

(10) Patent No.: US 12,620,703 B2
(45) Date of Patent: May 5, 2026

(54) RADIO SHEET SYSTEM AT HIGH FREQUENCIES

(71) Applicant: Telefonaktiebolaget LM Ericsson (publ), Stockholm (SE)

(72) Inventors: Yi Geng, Nanjing (CN); Pål Frenger, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 348 days.

(21) Appl. No.: 18/267,229

(22) PCT Filed: Dec. 18, 2020

(86) PCT No.: PCT/CN2020/137630
§ 371 (c)(1),
(2) Date: Jun. 14, 2023

(87) PCT Pub. No.: WO2022/126605
PCT Pub. Date: Jun. 23, 2022

(65) Prior Publication Data
US 2024/0079773 A1 Mar. 7, 2024

(51) Int. Cl.
*H01Q 3/24* (2006.01)
*H01Q 1/24* (2006.01)
(Continued)

(52) U.S. Cl.
CPC ............. *H01Q 3/245* (2013.01); *H01Q 1/246* (2013.01); *H01Q 15/08* (2013.01); *H01Q 19/062* (2013.01); *H04W 88/08* (2013.01)

(58) Field of Classification Search
CPC .... H04B 10/118; H04B 10/501; H04B 10/11; H04B 10/1123; H04B 10/503; H01Q 3/245; H01Q 1/246
See application file for complete search history.

(56) References Cited

U.S. PATENT DOCUMENTS

| | | |
|---|---|---|
| 2006/0028386 A1 | 2/2006 | Ebling et al. |
| 2019/0037416 A1 | 1/2019 | Linehan |

(Continued)

FOREIGN PATENT DOCUMENTS

| WO | 2018103897 A1 | 6/2018 |
|---|---|---|

OTHER PUBLICATIONS

Feng, "Low Complexity Iterative Detection for a Large-Scale Distributed MIMO Prototyping System," IEEE International Conference on Communications, 2019, Shanghai, China, 6 pages.
(Continued)

*Primary Examiner* — Iqbal Zaidi
(74) *Attorney, Agent, or Firm* — Sonoda & Kobayashi Intellectual Property Law; Sarvajit S. Patil

(57) ABSTRACT

The embodiments herein relate to radio sheet system at high frequencies. In an embodiment, there proposes a lens antenna system, comprising: a lens; a plurality of antenna sets attached to the lens; and a multiplexer connected to the plurality of antenna sets, for selectively activating an antenna set of the plurality of antenna sets, in order that a collimated beam is emitted through the lens from the activated antenna set. With embodiments herein, only one antenna is used to transmit a beamformed beam by lens with collimation capability, thus the embodiments may provide an alternative and more efficient way to replace beamforming functionality.

16 Claims, 9 Drawing Sheets

(51) Int. Cl.
    *H01Q 15/08*         (2006.01)
    *H01Q 19/06*         (2006.01)
    *H04W 88/08*        (2009.01)

(56)              References Cited

U.S. PATENT DOCUMENTS

| | | |
|---|---|---|
| 2020/0144719 A1 | 5/2020 | Scarborough et al. |
| 2020/0350680 A1* | 11/2020 | Yang ........................ H01Q 3/44 |
| 2022/0239010 A1* | 7/2022 | Hormis .................. H01Q 15/08 |
| 2024/0372618 A1* | 11/2024 | Landau .................... G02B 6/32 |

OTHER PUBLICATIONS

Interdonato, et al., "Ubiquitous cell-free Massive MIMO communications," EURASIP Journal on Wireless Communications and Networking, 2019, vol. 197, Springer, 13 pages.
International Search Report and Written Opinion for International Patent Application No. PCT/CN2020/137630, mailed May 20, 2021, 14 pages.

\* cited by examiner

Radio Stripe System

Analog multiantenna processing      Digital multiantenna processing

RADIO SHEET SYSTEM AT HIGH FREQUENCIES

This application is a 35 U.S.C. § 371 national phase filing of International Application No. PCT/CN2020/137630, filed Dec. 18, 2020, the disclosure of which is incorporated herein by reference in its entirety.

TECHNICAL FIELD

The embodiments herein relate generally to the field of wireless communication, and more particularly, the embodiments herein relate to radio sheet system at high frequencies.

BACKGROUND

Cell-Free Massive MIMO Communications

The combination of Massive MIMO (Multiple Input Multiple Output) operation, dense distributed network topology, and user-centric transmission design creates a new concept, referred to as cell-free massive MIMO, also called distributed massive MIMO, as illustrated in FIG. 1. The word "cell-free" signifies that at least from a user equipment's perspective, there are no cell boundaries during data transmission, while all (or a subset of) Access Points (APs) in the network cooperate to jointly serve the user equipment in a UE-centric fashion. The APs are connected via front-haul connections to central processing units (CPUs), which are configured for the coordination. The CPUs are in turn connected with each other via back-haul connection. The cellular or cell boundary concepts disappear in cell-free massive MIMO and the UEs are served simultaneously by all nearby antennas.

Radio Stripe System

The radio stripe system is a visionary concept where base stations and antennas thereon are rethought. This revolutionary new mobile network design is super-distributed, it has the potential to deliver better quality, easier deployment, at a nearly invisible form factor, and enables truly ubiquitous high capacity radio everywhere.

In radio stripe system, the antennas and the associated antenna processing units (APUs) are serially located inside a same cable, which also provides synchronization, data transfer, and power supply via a shared bus, as showed in FIG. 2.

The APs consist of antenna elements and circuit-mounted chips (including power amplifiers, phase shifters, filters, modulators, and A/D and D/A converters) inside the protective casing of a cable or a stripe.

Radio stripe system is designed wherein antenna elements and the associated antenna processing hardware are located inside the same cable.

Luneburg Lens

Luneburg lens is a spherical lens that a point source located at any point of the lens surface originates a collimated beam in the opposite direction. This property is independent of the lens diameter.

One of the application scenarios of the Luneburg lens is signal relay, in which the incoming signal is amplified by the antenna on the surface of the Luneburg lens, and then an amplified collimated outgoing beam may be obtained.

Baseband Processing

There are daunting demands for baseband processing and beamforming processing at high frequency bands.

Even for small-scale Distributed-MIMO (D-MIMO) prototyping system the baseband processing demand is daunting. For example, in a prototype with 16 APs and 16 UEs, each AP and UE is equipped with 8 antennas, and baseband processing is performed by 8 BPUs (baseband processing unit) and each BPU has Intel Xeon 72 core processors (576 CPU cores totally) in FIG. 3.

Beamforming Processing

In a digital beamforming architecture, each antenna element is equipped with its own RF chain and data converters (ADC and DAC). FIG. 4 is a schematic diagram showing a transmitting part of a digital beamforming architecture.

Having an RF chain and data converter for each antenna element provides the highest performance and flexibility. Multi-antenna techniques such as spatial multiplexing and interference suppression can reach its full potential when used in a fully digital array. However, a fully digital array can also be expensive in terms of cost and power consumption. These aspects are particularly pronounced at millimeter-wave frequencies, since the number of antenna elements is expected to be large in order to populate a sufficiently large physical antenna area that can achieve a required link budget. Furthermore, the large bandwidth foreseen to be used at these frequencies requires the data converters to operate at high sampling rates, leading to high power consumption and heat generation. A large bandwidth coupled with many digitized antenna elements is also challenging from a shear data shuffling perspective, putting high demands on data interfaces between the antenna array and signal processing units. This also leads to high demands on signal processing capacity. Therefore, a fully digital array is currently a likely implementation only in the low frequency bands. In millimeter-wave bands, analog and hybrid array architectures will be prevalent, at least in the near future.

Due to above drawbacks, it is hard to implement digital beamforming at high frequency bands when the number of antennas of each AP increases, especially in radio stripe system with huge number of APs.

Even taking into account the use of analog beamforming, operation in millimeter-wave frequency spectrum is inherently disadvantageous in terms of complexity and cost. For example, the cost of analog arrays for radio stripe system at high frequency bands will typically be increased due to per-antenna phase shifts providing analog beamforming.

REFERENCES

1. Giovanni Interdonato et al., Ubiquitous cell-free Massive MIMO communications, https://arxiv.org/abs/1804.03421v4;
2. Y. Feng, M. Wang, D. Wang and X. You, Low Complexity Iterative Detection for a Large-Scale Distributed MIMO Prototyping System, ICC 2019-2019 IEEE International Conference on Communications (ICC), Shanghai, China, 2019, pp. 1-6, doi: 10.1109/ICC.2019.8761605;
3. Patent application WO2018103 897A9.

SUMMARY

Cell-free massive MIMO system, with numerous antennas, beamforming functionality and its associated hardware, becomes more complex and expensive at higher frequencies.

For radio stripe system works at high frequency, the associated processing hardware for massive MIMO can be too large to locate inside the cable.

From a practical point of view, high frequency radio stripe system solution, where a massive MIMO antenna panel and its associated antenna processing hardware are placed inside the same cable, has a number of drawbacks:

Heavy power consumption and heat concentration;

Bulky and weighty antenna processing hardware;

High cost;

The limited front-haul capability limits data traffic arriving from the APs.

In view of above problems in the prior art, the embodiments herein propose to "radio sheet system" to improve existing antenna system "radio stripe system" at higher frequency bands.

In an embodiment, there proposes a lens antenna system, comprising: a lens; a plurality of antenna sets attached to the lens; and a multiplexer connected to the plurality of antenna sets, for selectively activating an antenna set of the plurality of antenna sets, in order that a collimated beam is emitted through the lens from the activated antenna set.

In another embodiment, there proposes a sheet antenna system, comprising: a sheet base; a plurality of lens antenna systems on the sheet base in a mesh pattern; and a plurality of interconnects, each of the plurality of interconnects is used for connecting at least two of the plurality of lens antenna systems. Furthermore, at least one of the plurality of lens antenna systems further comprising: a lens; a plurality of antenna sets attached to the lens; and a multiplexer connected to the plurality of antenna sets, for selectively activating an antenna set of the plurality of antenna sets, in order that a collimated beam is emitted through the lens from the activated antenna set.

With embodiments herein, benefits can be obtained compared to conventional radio stripe system at high frequencies, such as:

(i) Deployment does not require highly qualified personnel. Theoretically, an antenna arrangement of radio sheet system needs only one (plug and play) connection either to other antenna arrangements or directly to the CPU.

(ii) The embodiments use partially connected mesh topology (each AP is connected to adjacent APs at most for low complexity and cost) offers increased robustness and resilience, highly redundancy between APs offers limited overall impact and resilience on the network when a few connections being defected.

(iii) The digital beamforming can be implemented by relatively low complexity, cost and power consumption.

(iv) The scale of proposed system in the embodiments is smaller than conventional solutions at high frequency bands because only very few antennas are active, therefore introduce very small baseband processing demands.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements, and in which.

DETAILED DESCRIPTION OF EMBODIMENTS

Embodiments herein will be described in detail hereinafter with reference to the accompanying drawings, in which embodiments are shown. These embodiments herein may, however, be embodied in many different forms and should not be construed as being limited to the embodiments set forth herein. The elements of the drawings are not necessarily to scale relative to each other.

Reference to "one embodiment" or "an embodiment" means that a particular feature, structure or characteristic described in connection with the embodiment is included in at least one embodiment. Thus, the appearances of the phrase "in an embodiment" appearing in various places throughout the specification are not necessarily all referring to the same embodiment.

The term "A, B, or C" used herein means "A", or "B", or "C"; the term "A, B, and C" used herein means "A" and "B" and "C"; the term "A, B, and/or C" used herein means "A", or "B", or "C", or "A and B", or "A and C", or "B and C", or "A, B, and C".

Existing radio stripe system works well at a relative lower frequency, such as 3.5 GHz, however for radio stripe system works at high frequency, the associated processing hardware for massive MIMO can be too large to locate inside the cable.

From a practical point of view, high frequency radio stripe system solution, where a massive MIMO antenna panel and its associated antenna processing hardware are placed inside the same cable, has a number of drawbacks:

Heavy heat concentration;

Bulky and weighty antenna processing hardware;

High cost.

Due to above drawbacks, it is difficult and even unpractical to implement radio stripe system at higher frequencies. Existing radio stripe system works at frequency 3.5 GHz and only dual polarized antennas are consisted in each AP, therefore beamforming is unavailable and omni-radiation only with low antenna gain.

The embodiments of the disclosure propose a radio sheet system, which improves the radio stripe system at least from the following aspects:

AP consists of multiple antennas on lens (such as Luneburg lens) surface and antenna processing hardware unit for selectively activating the multiple antennas.

The elongated shape of radio stripe system is extended to surficial shape (stripe to mesh).

Beamforming functionality and its associated processing hardware are replaced by Luneburg lens to overcome the drawbacks of conventional radio stripe system mentioned in background part.

Figure 5:
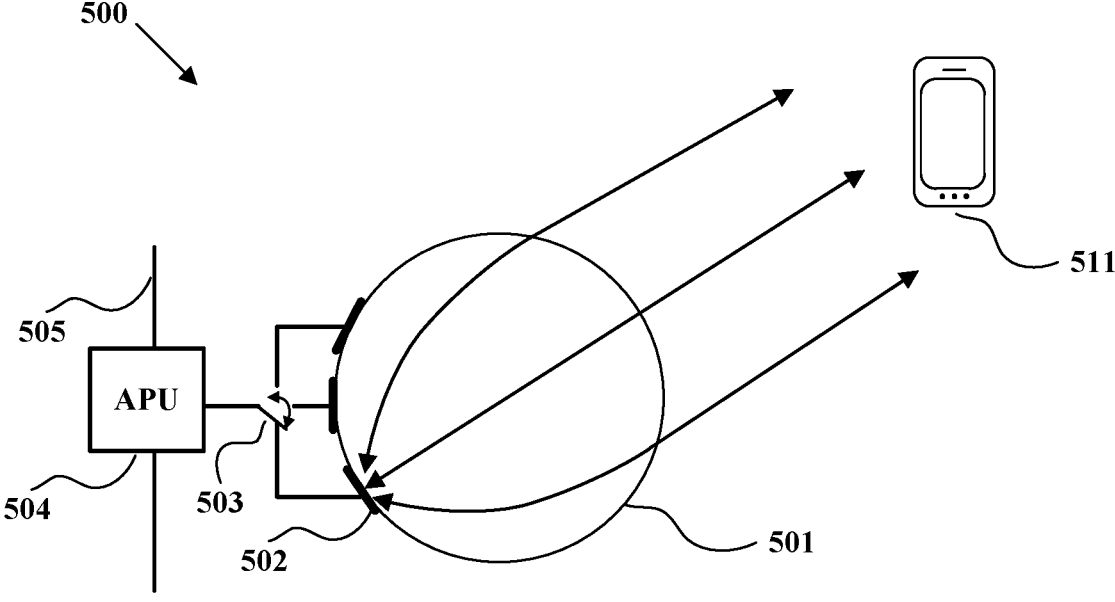
FIG. 5 is a schematic diagram showing an example lens antenna system, according to the embodiments herein.

FIG. 5 is a schematic diagram showing an example lens antenna system, according to the embodiments herein.

As shown in FIG. 5, the example lens antenna system 500 may comprise a lens 501; a plurality of antenna sets 502 attached to the lens 501; and a multiplexer 503 connected to the plurality of antenna sets 502, for selectively activating an antenna set of the plurality of antenna sets 502. A collimated beam may be obtained from the radiation, which is emitted by the activated antenna set 502 and goes through the lens 501.

In an embodiment, the example lens antenna system 500 may be implemented as an Access Point (AP) serving for a User Equipment (UE) 511.

Figure 6:
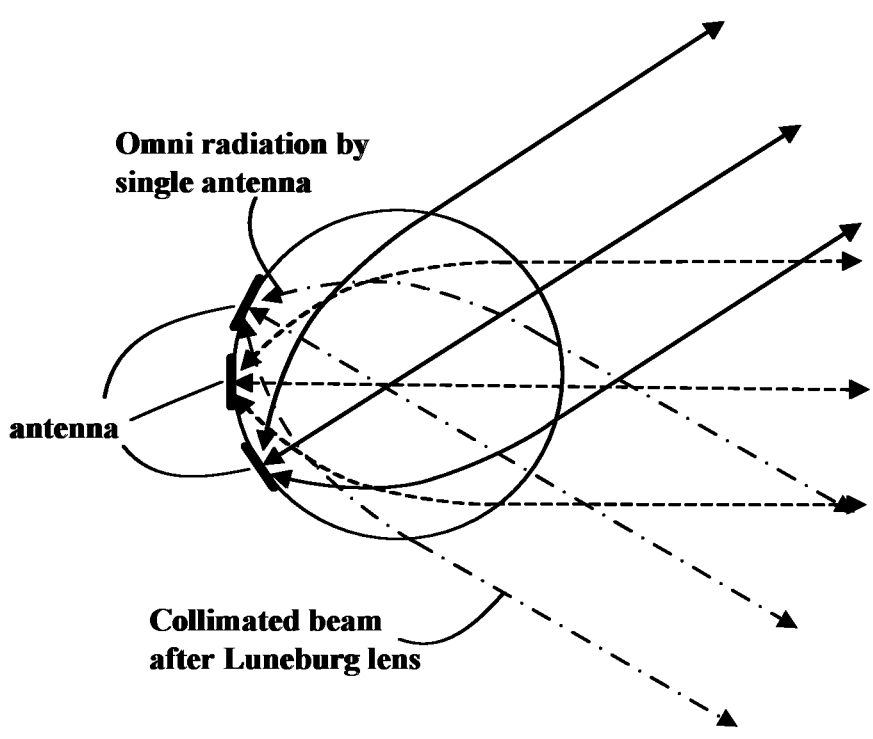
FIG. 6 is a schematic diagram showing an example lens antenna system using a Luneburg lens, according to the embodiments herein.

In an embodiment, there are several approaches for the plurality of antenna sets 502 to attach to the lens 501. For example, in the first approach, as shown in FIGS. 5 and 6, the plurality of antenna sets 502 may be formed or bonded on the surface of the lens 501. In the second approach, each of the plurality of antenna sets 502 may be mounted on a support, and then the support is mounted on the surface of the lens 501. In the third approach, the plurality of antenna sets 502 may be embedded inside the lens 501. The second and third approaches can be utilized when a diverging beam is wanted to cover a small area in a certain distance.

In an embodiment, the lens 501 is a Luneburg lens. The Luneburg lens is particularly adequate for multi-beam applications since the symmetry ensures that all beams are equal independent of the feed position on the lens surface. FIG. 6 is a schematic diagram showing an example lens antenna system using a Luneburg lens, according to the embodiments herein. As shown in FIG. 6, the omni radiation emitted from the antenna located on any point of the surface of Luneburg lens, the collimated beam may be obtained after the refraction of the Luneburg lens.

By forming or bonding the plurality of antenna sets 502 on the surface of the Luneburg lens, a collimated beam may be emitted from any of the plurality of antenna sets 502. As a result, a single dipole antenna forming or bonding on the surface of the Luneburg lens is equivalent to beamforming functionality of massive MIMO, omni-radiation from single antenna is "beamformed" to high gain radiation pattern by Luneburg lens.

Note that, for most application scenario of the radio sheet system, the serving distance of the AP (i.e., the distance from the AP to a UE) is not so long, attenuation rate won't be that high before an emitted signal being received (applicable for both uplink and downlink). Therefore, requirement for a collimated beam is not so strict. As aforementioned, a collimated beam may also be applicable. Thus, it is understood by persons skilled in the art that the embodiments are limited to forming the plurality of antenna sets 502 on the surface of the Luneburg lens 501, other approaches for forming the plurality of antenna sets 502 on the lens 501, and other types of lens are also applicable for emitting the collimated beam from the activated antenna set 502 through the lens 501.

Referring back to FIG. 5, in an embodiment, the example lens antenna system 500 may further comprise an antenna processing unit (APU) 504 connected to the multiplexer 503. In an embodiment, the APU 504 provides a signal to be handled by the activated antenna set. The APU 504 may further comprise power amplifiers, phase shifters, filters, modulators, and A/D and D/A converters, so that the APU 504 may pre-process the signal to be emitted.

In an embodiment, in addition to providing a signal to be handled by the activated antenna set, the APU 504 may further provide a signal to the multiplexer 503 for the selectively activating. And the multiplexer 503 performs the above selectively activating based on the signal provided by the APU 504.

In a further embodiment, the multiplexer may include a logic gate electronics including at least one digital switch. The connected multiplexer 503 and APU 504 may be integrated with each other. For example, the multiplexer 503 and APU 504 may be integrated on a same chip or even on a same die, so that the structure of the lens antenna system 500 may be further simplified.

In an embodiment, the activated antenna set 502 is selectively activated according to a direction or position of the UE 511. In particular, in an initial detection phase, the initial access of the UE can be applied by antenna-sweeping for reference signal transmission. The plurality of antenna sets 502 may be activated one by one, to emit reference signals to all possible direction for detecting the position or direction of the UE 511. Upon receiving one or more reference signals, the UE 511 may return to the lens antenna system 500 with a response signal. Then, the example lens antenna system 500 acknowledges the position or direction of the UE 511, and determines an antenna set to be used for the UE 511. When the UE 511 enters connected mode, the determination of which antenna set to be used can apply for regular procedure of cellular system.

Once the antenna set used for the UE 511 is determined, the example lens antenna system 500 may selectively activate the antenna set 502 for emitting a collimated beam towards the UE 511.

In an embodiment, at least two of the plurality of antenna sets 502 are selectively activated in a duplex approach (such as time division approach and/or frequency division approach), to provide large degree of flexibility and avoid interference while providing services to a plurality of UEs. In particular, in the case that two or more UEs 511 are served by the example lens antenna system 500, a time division approach may be used by the example lens antenna system 500. For example, the first antenna set may be activated in the first time slot for emitting a collimated beam towards the first UE, and then the second antenna set may be activated in the second time slot for emitting a collimated beam towards the second UE.

Alternatively, a frequency division approach may be used by the example lens antenna system 500; for example, the first antenna set may be activated for emitting a collimated beam towards the first UE at a first frequency, and the second antenna set may be activated for emitting a collimated beam towards the second UE at a second frequency. In a further embodiment, one or more UEs may be offloaded to a neighboring lens antenna system 500.

In an embodiment, the dipole antenna including two antennas may be used for the antenna sets 502. In particular, each of the plurality of antenna sets 502 may include a pair of antenna elements with perpendicular polarization directions. Note that, the shape and number of the antenna elements in an antenna set 502 may be variable according to for example the operation frequency.

In an embodiment, the APU 504 may further be connected to a power source (not shown) via an interconnect 505. In an embodiment, the APU 504 may further be connected to a central processing unit (CPU), to receive, from the CPU, instruction and/or data, for example instruction and/or data for controlling the operation of the example lens antenna system 500.

Figure 7:
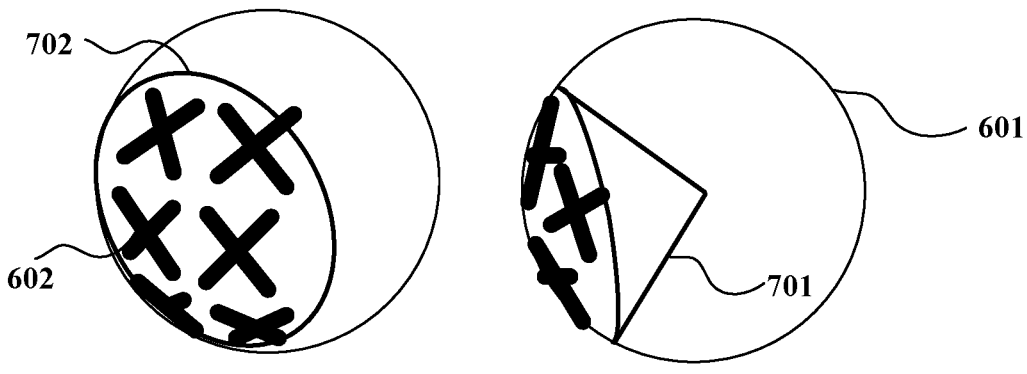
FIG. 7 is a schematic diagram showing an example arrangement of the plurality of antenna sets on the surface of the lens, according to the embodiments herein.

FIG. 7 is a schematic diagram showing an example arrangement of the plurality of antenna sets 502 on the surface of the lens 501, according to the embodiments herein.

In an embodiment, the plurality of antenna sets 502 may be located on spherical surface area 702 within the range of a circular cone 701, as shown in FIG. 7. The vertex of the circular cone 701 is the center of the Luneburg lens 501, and the cone angle of the circular cone 701 is equal to or less than 90 degrees.

By placing the polarized antenna elements on the spherical surface area as shown in FIG. 7, a massive antenna array lying on the surface of the lens within 90 degrees steering range doesn't block any signal from transmitter/receiver feeds for high angles. As a result, the interference of the example lens antenna system 500 may be reduced.

In an embodiment, an operation frequency of the plurality of antenna sets includes 30 GHz or above. For example, the operation frequency of the plurality of antenna sets 502 may be set as 60 GHz or higher frequency.

The size of the antenna element depends on the frequency that the antenna is designed to operate at. The size of each antenna element is proportional to half of the wavelength. For example, a frequency of 60 GHz requires that the size of the antenna element is about 2.5 mm; 280 GHz requires that the size of the antenna element is about 0.5 mm.

In an embodiment, the size of the Luneburg lens is depended on the operation frequency of the plurality of antenna sets 502. Note that, there are other factors for selecting the radius of the Luneburg lens, such as weight and/or volume of the Luneburg lens.

In an embodiment, for a frequency of 60 GHz (the size of the antenna element is 2.5 mm), the radius of the Luneburg lens may be selected as about 1 cm (bigger lens has better performance however it could lead to bulky and heavy structure).

In this embodiment the spherical surface 702 may be calculated as:

$$2\pi\left(1 - \frac{1}{\sqrt{2}}\right) \times 100 = 184 \text{ mm}^2$$

For single dual polarized antenna element at 60 GHz, the antenna aperture (effective antenna area) may be calculated as:

$$\left(\frac{\lambda/2}{\sqrt{2}}\right)^2 = 3.125 \text{ mm}^2$$

8

Therefore, antenna array with about 100 antennas can be placed on the lens surface.

The physical space needed for antennas will be reduced radically as the frequency increases, the surface area of less than square centimeter could host hundreds even thousands of antennas at millimeter-wave frequency bands.

For 6G D-MIMO, sub-THz bands e.g. 100-300 GHz is under considering. In this case, more antenna elements can be placed on the surface of Luneburg lens with higher frequency, or a smaller lens for same number of antenna elements. Therefore, the proposed embodiments can be more flexible at higher frequency bands.

With the proposed embodiments, for example the embodiments in connection with FIGS. 5, 6 and 7, lenses with collimation capability such as Luneburg lenses may be used to transform the omni-radiation pattern of single or few active antennas into high gain radiation pattern, the rest of antennas are inactive. With this approach, only activating one antenna and originating a collimated beam to serve the device located in the opposite direction.

Instead of multi-antenna processing (that is, beamforming is applied), the proposed embodiments may use only one antenna to transmit a beamformed beam by lens with collimation capability such as Luneburg lens. This is an alternative and more efficient way to replace beamforming functionality.

Figure 8:
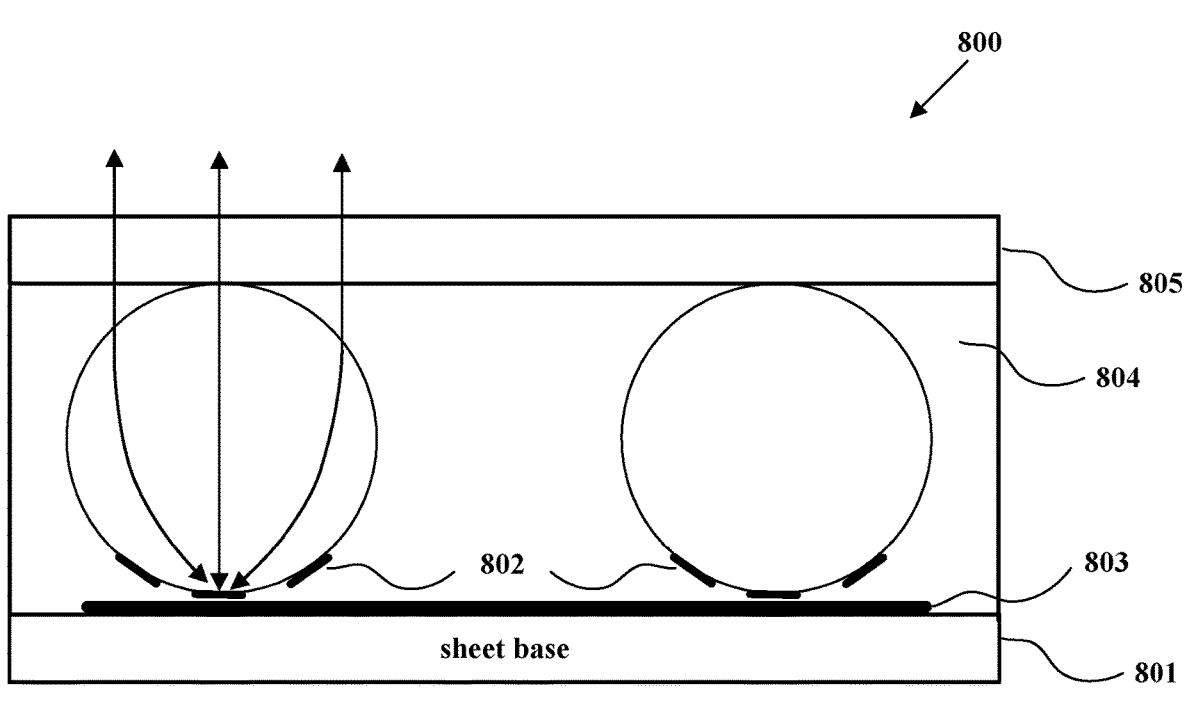
FIG. 8 is a schematic diagram showing a sectional view of an example sheet antenna system, according to the embodiments herein.

FIG. 8 is a schematic diagram showing a sectional view of an example sheet antenna system, according to the embodiments herein. As shown in FIG. 8, in the embodiments, the example sheet antenna system 800 may comprise a sheet base 801; a plurality of lens antenna systems 802 on the sheet base 801; and a plurality of interconnects 803, for connecting the plurality of lens antenna systems 802.

In an embodiment, at least one of the plurality of lens antenna systems 802 includes the lens antenna system 500 described in connection to FIG. 5, FIG. 6 and FIG. 7.

In an embodiment, the plurality of lens antenna systems 802 may be arranged in a mesh pattern, as may be seen in the following FIG. 10. Here, the term "mesh" means that the plurality of lens antenna systems 802 are partially connected, that is, one of the plurality of lens antenna systems 802 does not need to connect to all other lens antenna systems 802. In particular, one of the plurality of lens antenna systems 802 may only connect to a part of its neighboring lens antenna system.

Note that, the term "mesh" does not mean that the plurality of lens antenna systems 802 may be arranged in a two-dimensional pattern. In fact, the mesh pattern also allows for three-dimensional arrangement, so as to fit for example the corner of the room.

The example sheet antenna system 800 may be referred as "radio sheet system". The antenna arrangement thereof comprises a surficial rectangle body housing a plurality of lens antenna systems 802 implementing as APs. Each AP is connected to adjacent APs at most to form partially connected mesh topology.

In radio stripe system using bus topology, each AP is connected by a shared bus, but the robustness of this topology might be low. When stripes being defected, the impacted APs are out of service, the accidents are prone as the radio stripe system is mounted in the areas with human in congestion usually.

Compared with the radio stripe system, the example sheet antenna system 800 uses partially connected mesh topology (each AP is connected to adjacent APs at most, for low complexity and cost) offers increased robustness and resilience, highly redundancy between APs offers limited overall impact and resilience on the network when a few connections being defected. Another advantage of the example sheet antenna system 800 is that alternative data stream routes can be selected in case of congestion happens.

In an embodiment, the example sheet antenna system 800 may further comprise padding material 804 for wrapping the plurality of lens antenna systems 802 and the plurality of interconnects 803; and covering material 805, for covering the sheet base 801, the plurality of lens antenna systems 802, the plurality of interconnects 803, and the padding material 804.

In an embodiment, the sheet base 801 comprises a flexible film. In a further embodiment, all of the sheet base 801, the padding material 804, and the covering material 805 include flexible material.

Figure 9:
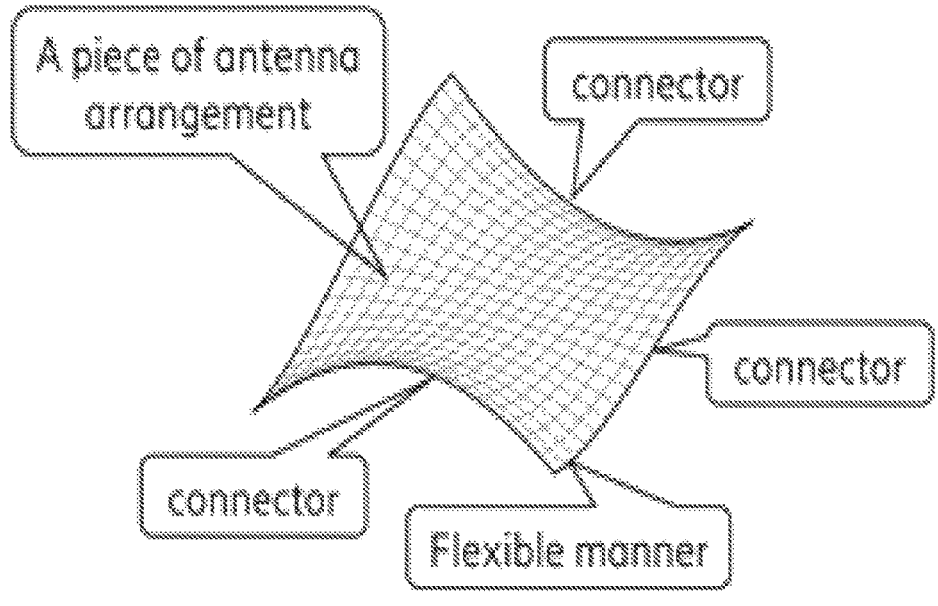
FIG. 9 is a schematic diagram showing a flexible sheet structure of the example sheet antenna system, according to the embodiments herein.

FIG. 9 is a schematic diagram showing a flexible sheet structure of the example sheet antenna system, according to the embodiments herein. This flexible sheet structure guarantees the antenna arrangement can be cut or connected to any shapes. The radio sheet system enables invisible installation and deployment in many existing construction elements. For example, the radio sheet system may be installed and deployed outdoor as well as indoor areas, such as dense city squares, malls/offices, stadiums, train stations, factories and warehouses.

In an embodiment, the thickness of the example sheet antenna system 800 may be practically negligible compared to the surficial area. In an embodiment, the thickness of the sheet base 801 and the covering material 805 may be 1 mm or less, and may be negligible compared with the thickness of the Luneburg lens.

In an embodiment, for the operation frequency of 60 GHz, the total thickness of the example sheet antenna system 800 may be about 2 cm (for wrapping a Luneburg lens with a radius of about 1 cm), therefore, the antenna arrangement has a flexible structure and surficial shape that it is able to be rolled, bent for many deployment scenarios, e.g. mount the antenna arrangement to a wall or ceiling or roof, it is also possible to arrange the APs facing different directions.

Figure 10:
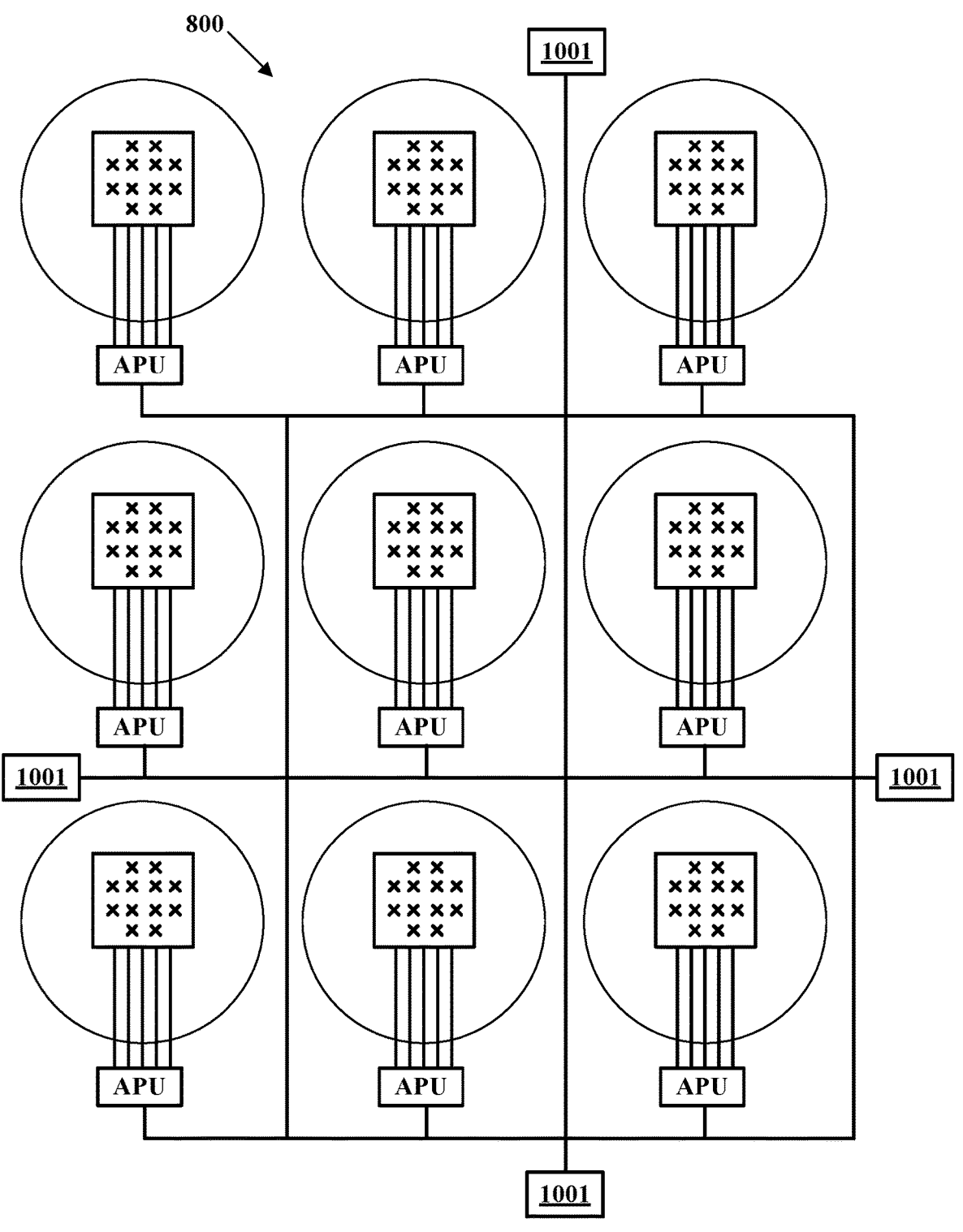
FIG. 10 is a schematic diagram showing a top view of the example sheet antenna system in two-dimensional array, according to the embodiments herein.

FIG. 10 is a schematic diagram showing a top view of the example sheet antenna system in two-dimensional array, according to the embodiments herein. For simplicity of the disclosure, only drawing 9 APs are shown.

In an embodiment, the plurality of interconnects 803 include a plurality of row interconnects and a plurality of column interconnects. Each of the plurality of row interconnects may be used for connecting a plurality of lens antenna systems in the same row, and each of the plurality of column interconnects may be used for connecting a plurality of lens antenna systems in the same column, as shown in FIG. 10.

In an embodiment, each of the plurality of interconnects is used for providing synchronization, data transfer, and power supply for the lens antenna systems 802 connected thereto.

In an embodiment, the example sheet antenna system 800 may further comprise at least one connector 1001. In an embodiment, the connector may be connected to a power source. In an embodiment, the connector may be connected to another sheet antenna system.

Figure 1:
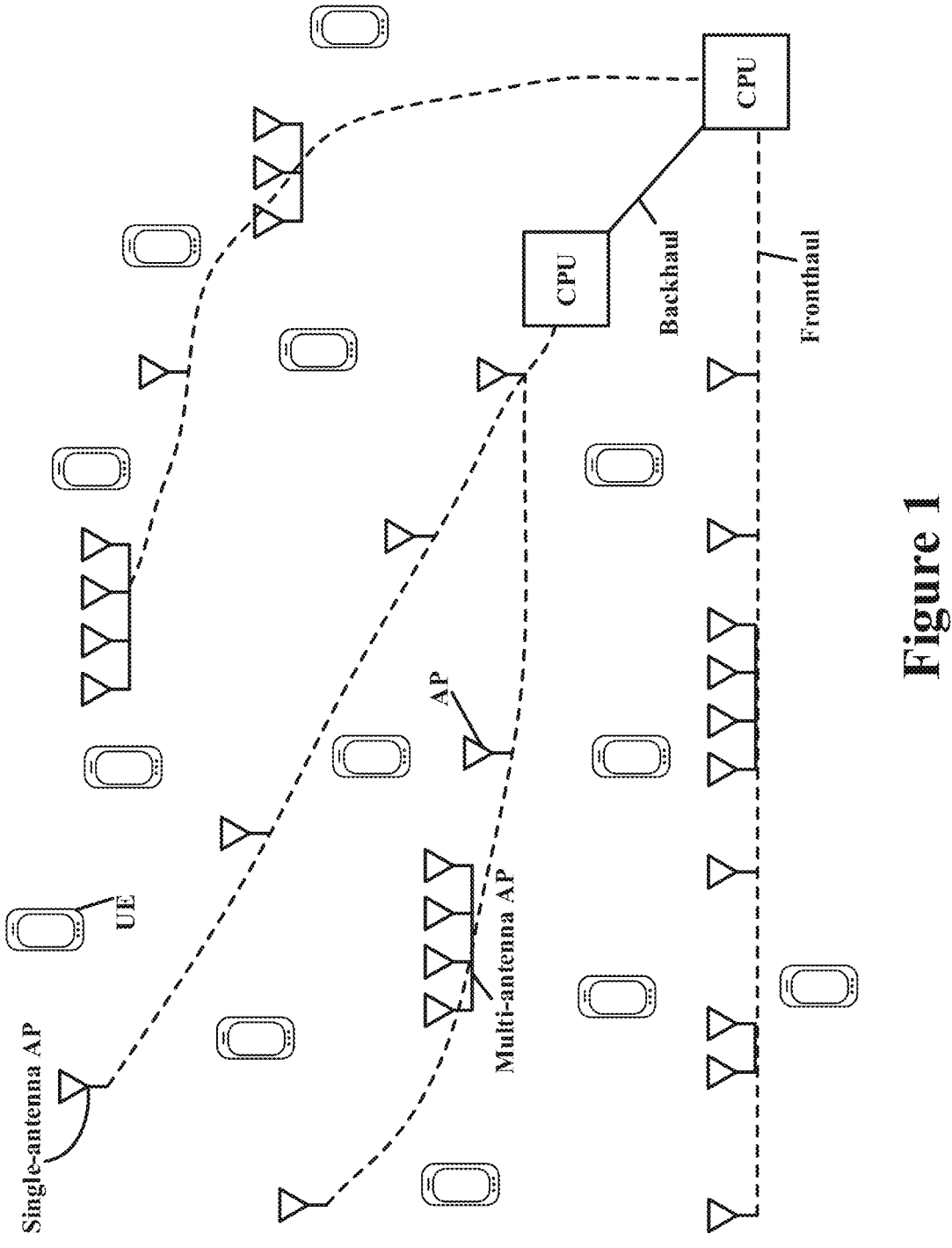
FIG. 1 is a schematic diagram showing a cell-free massive MIMO system.
Figure 2:
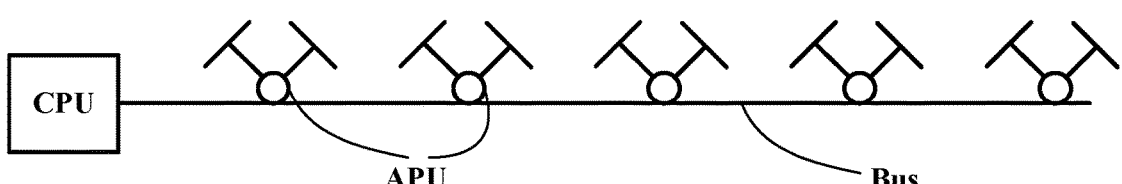
FIG. 2 is a schematic diagram showing a radio stripe system.
Figure 3:
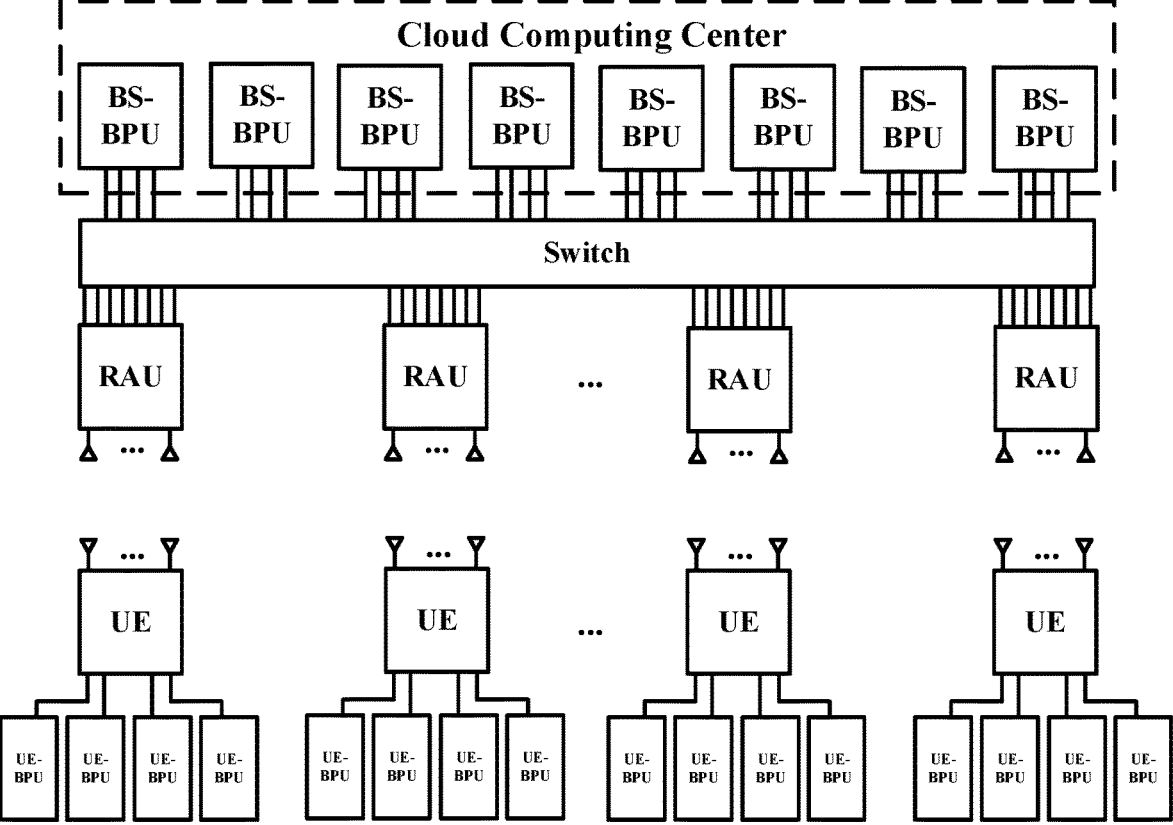
FIG. 3 is a schematic diagram showing computing resources required for the baseband processing, according to prior art.
Figure 4:
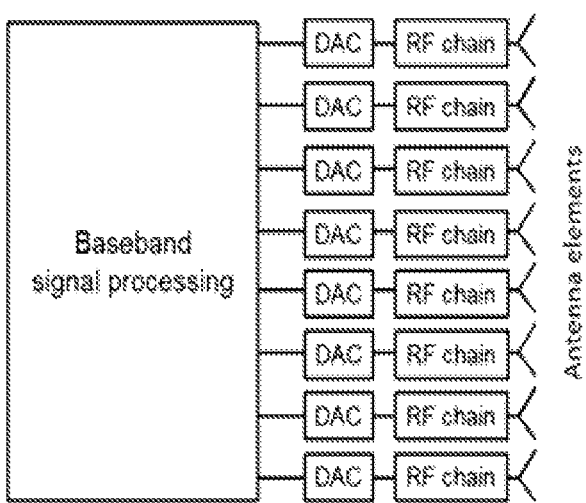
FIG. 4 is a schematic diagram showing a transmitting part of a digital beamforming architecture, according to prior art.

For example, as shown in FIG. 10, the example sheet antenna system 800 may comprise several connectors 1001 at each side, for connecting the example sheet antenna system 800 to a central unit or further sheet antenna system. Thereby, the example sheet antenna system 800 may form a part of a distributed massive Multiple Input Multiple Output (MIMO) system, such as the MIMO system as shown in FIG. 1.

Figure 11:
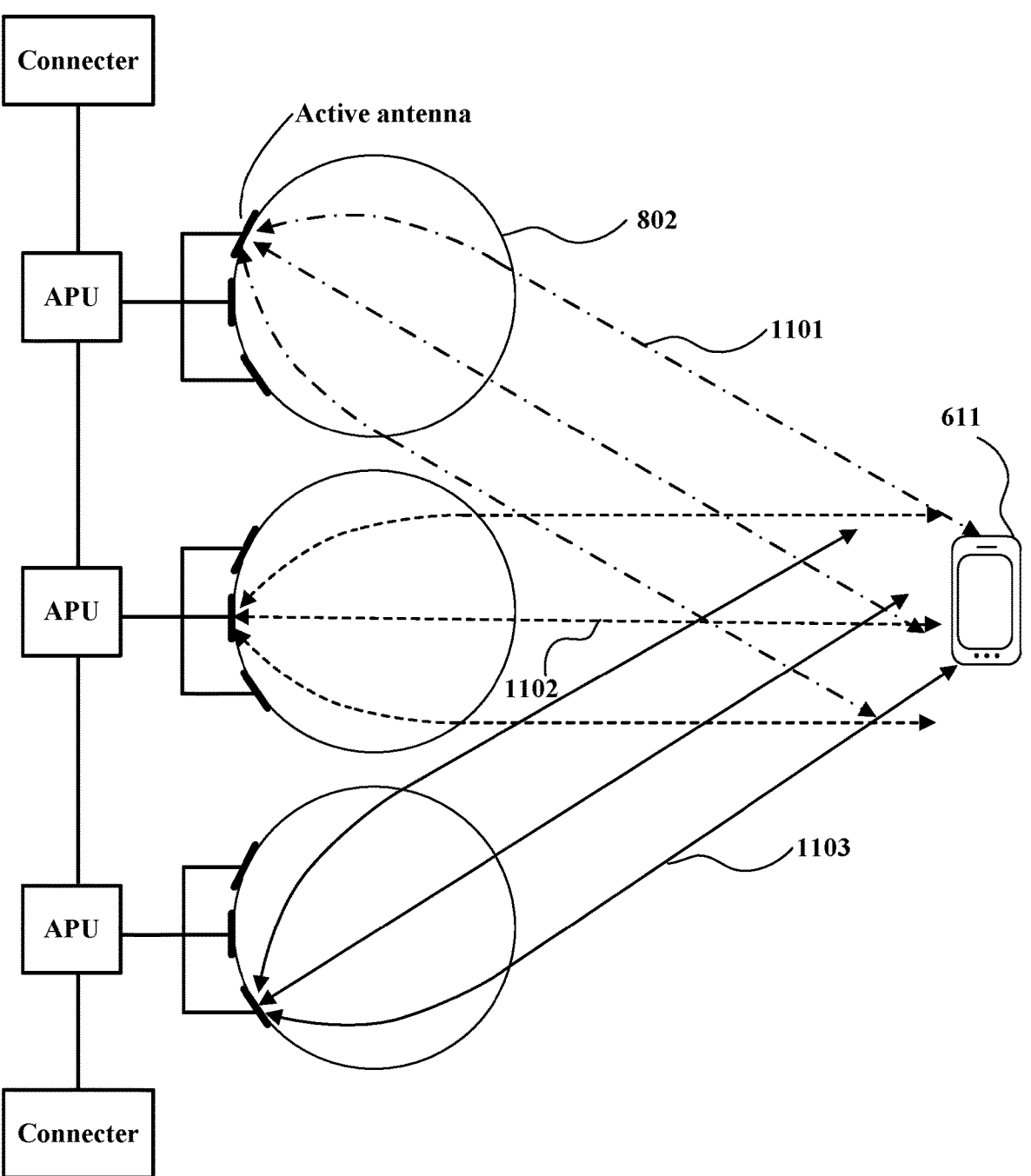
FIG. 11 is a schematic diagram showing a cooperation mode of the plurality of lens antenna systems in the example sheet antenna system, according to the embodiments herein.

FIG. 11 is a schematic diagram showing a cooperation mode of the plurality of lens antenna systems 802 in the example sheet antenna system 800, according to the embodiments herein.

As shown in FIG. 11, in an embodiment, a plurality of collimated beams 1101, 1102, 1103 are emitted respectively from 3 lens antenna systems, which is a subset of the plurality of lens antenna systems 802 in the sheet antenna system 800, to a same User Equipment (UE) 511 simultaneously. It is understood by persons skilled in the art that, the subset of the plurality of lens antenna systems 802 may comprise one or more lens antenna systems 802. In a further embodiment, the UE 511 is served by one lens antenna systems 802 in the sheet antenna system 800.

As shown in FIG. 11, the antennas sets on different positions of the lens surface are activated in different lens antenna systems 802, so that their omni-radiation patterns are refracted into high gain radiation patterns to serve a same UE 511.

Note that collimated beams 1101, 1102, 1103 in FIG. 11 showing both downlink direction and uplink direction is just a simplified illustration that signals emitted from an activated antenna set and received by the UE 511 are transmitted in downlink beam, while signals sent from the UE 511 in an opposite direction going through the lens and received by the activated antenna set are transmitted in uplink beam.

Beamforming Processing Computational Complexity Consideration

Figure 12A:
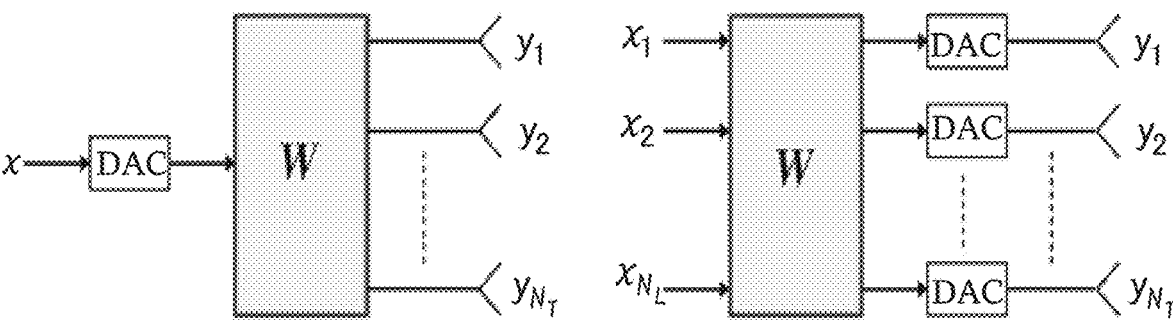
FIGS. 12A-C is a schematic diagram showing a transmitting part of a beamforming architecture, according to the embodiments herein.

In general, any multi-antenna transmission scheme (analog beamforming or digital beamforming) can be modeled with $N_L$ layers being mapped to $N_T$ transmit antennas by means of multiplication with a matrix W of size $N_T \times N_L$ as illustrated in FIG. 12A. In order to overcome the large free-space pathloss at high frequency bands, $N_T$ can be hundreds even thousands of antennas at high frequency bands.

Figure 12B:
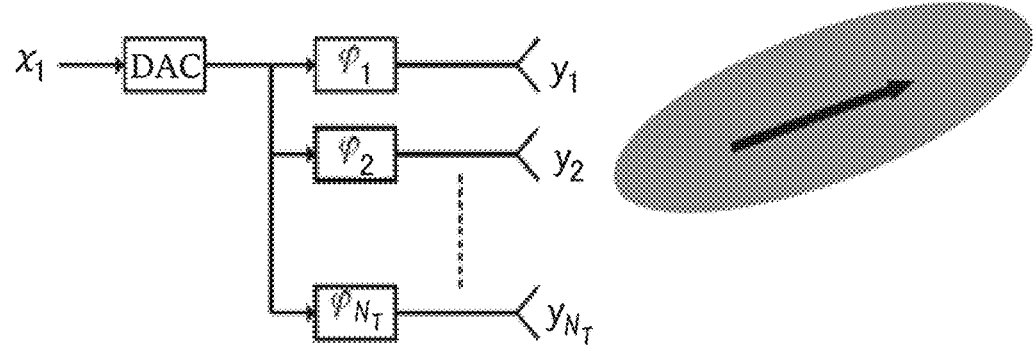

For analog beamforming, $N_L = 1$ or 2 (2 for polarized antennas) and per-antenna phase shifts providing beamforming as showed in FIG. 12B. For digital beamforming, its implementation complexity is extremely high especially the need for one digital-to-analog converter per antenna element at higher frequency bands.

Figure 12C:
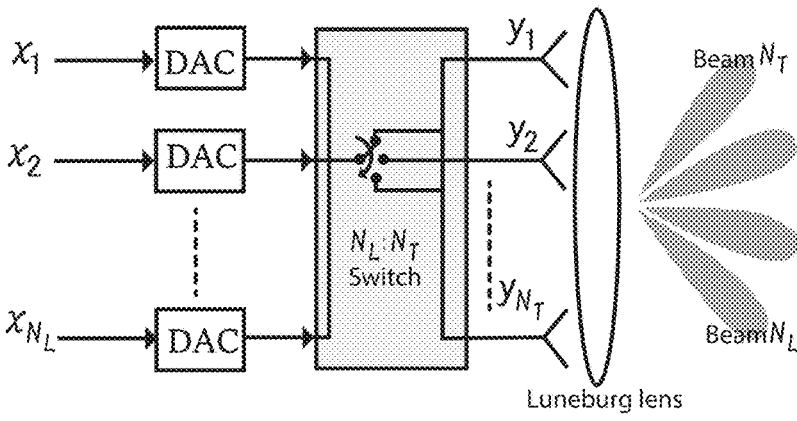

The proposed system in the embodiments replaces conventional beamforming blocks (beamforming control and phase shifts for analog beamforming, layer-to-antenna mapping block and beamforming control for digital beamforming) with very low-cost logic gate electronics for example digital switch as illustrated in FIG. 12C.

If $N_L$ number of devices are supported simultaneously ($N_L = 1$ for analog beamforming and $N_L > 1$ for digital beamforming), which means $N_L$ RF chains are requested. A $N_L : N_T$ switch between $N_L$ RF chains and $N_T$ antennas can replace beamforming functionality with lower complexity, size, cost and power consumption.

In an embodiment, an AP is designed to serve maximum 5 UEs simultaneously, and each AP has 100 antennas. In such embodiment, 5 RF chains and a 5:100 switch are requested to implement digital beamforming functionality. Proposed system in the embodiments has very low complexity and low cost compared to conventional digital beamforming with 100 RF chains and A/D converters.

Baseband Processing Computational Complexity Consideration

Consider a large-scale D-MIMO system at millimeter-wave consists of 16 APs and 5 users. Each AP is equipped with 100 antennas and each user is equipped with 8 antennas, which means antenna size (channel matrix H) is 1600×

40. The conventional D-MIMO system becomes impractically if the channel matrix H is 1600×40 and the complexity of baseband processing (joint processing, precoding) is rather high. The real-time inversion of 1600×40 channel H matrix is impossible with current computing capability.

For radio sheet system, as only one antenna is activated for each AP, the complexity of the proposed radio sheet system is reduced dramatically, the channel H matrix is reduced from 1600×40 to 16×40, which is acceptable size for real-time matrix inversion.

Figure 13:
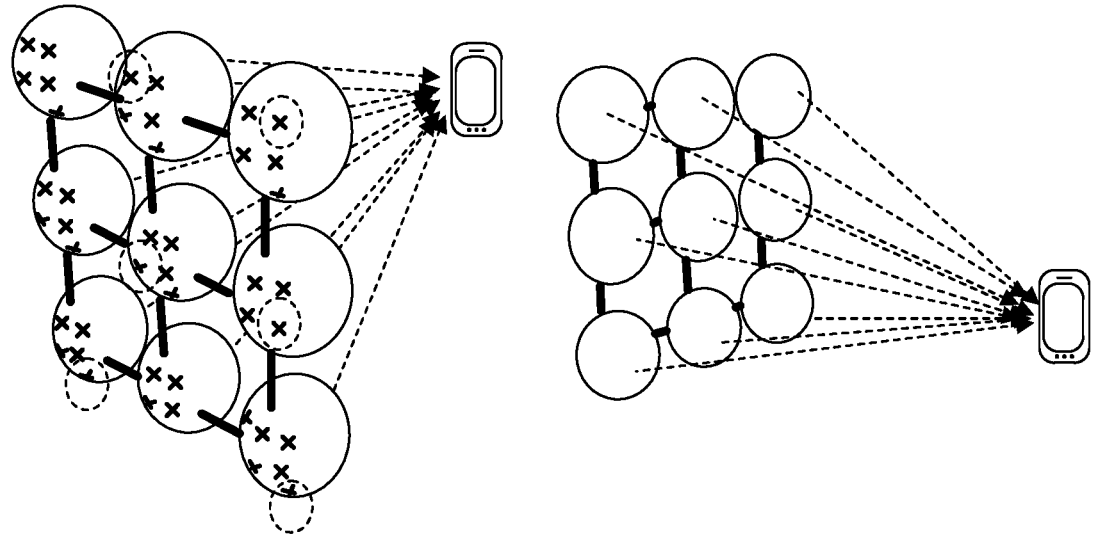
FIG. 13 is a schematic stereogram showing a cooperation mode of the plurality of lens antenna systems in the example sheet antenna system, according to the embodiments herein.

FIG. 13 is a schematic stereogram showing a cooperation mode of the plurality of lens antenna systems in the example sheet antenna system, according to the embodiments herein.

For simplicity of the disclosure, only drawing 9 APs and 9 polarized antenna elements on each AP in FIG. 13. Only one antenna is activated for each AP to transmit a collimated beam in the opposite direction to the UE.

The directions between each AP of radio sheet system and an arbitrary UE is substantially various by invoking a large number of distributed APs. Due to large number APs are geographically placed over a large area, a given UE has different directions to different APs. Therefore, even for APs with a few antennas, an arbitrary UE is easily served by a number of APs.

A problem of conventional cell-free massive MIMO is that a large number of antennas generate a large amount of data. This implies that with traditional radio to antenna interfaces very large capacity fiber network of front-haul/back-haul are needed to deliver this data around.

The required front-haul/back-haul capacity of a cell-free system is proportional to the number of simultaneous active antennas, a problem with a massive MIMO deployment is that a large number of antennas generate a large amount of data, this implies that traditional cell-free system at higher frequency needs very large capacity fiber network to shuffle this data around.

The proposed system in the embodiments has only one antenna be activated for each AP at a time therefore very lower data streams are generated than conventional cell-free system.

The technical advantages of the proposed radio sheet system in the embodiments over the conventional radio stripe system may be apparent by referring the following table 1.

Reference has been made herein to various embodiments. However, a person skilled in the art would recognize numerous variations to the described embodiments that would still fall within the scope of the claims.

It should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

ABBREVIATIONS

6G The sixth generation wireless communication system
ADC Analog-Digital Converter
AP Access Point
APU Antenna Processing Unit
CPU Central Processing Unit
DAC Digital-Analog Converter
D-MIMO Distributed MIMO
MIMO Multiple Input Multiple Output
UE User equipment.

What is claimed is:
1. A lens antenna system, comprising:
a lens;
a plurality of antenna sets attached to the lens; and

TABLE 1

Comparison of conventional distributed MIMO and "radio sheet system" at high frequencies.

|  | Conventional distributed MIMO (for example 100 antennas for each AP) | Radio sheet system |
|---|---|---|
| cost | 100 RF chains, including power amplifiers, phase shifters, filters, modulators, and A/D and D/A converters. | A few RF chains, if each AP is designed to serve maximum 5 UEs simultaneously, 5 RF chains are needed. Very low-cost logic gate electronics for example digital switch |
| Size and weight | Hardware of 100 RF chains can be too large and weighty for D-MIMO system, e.g., radio stripe system | 5 RF chains have acceptable size and weight to locate inside the cable of radio stripe system |
| Power and heat concentration | 100 RF chains generate very high power consumption and heat generation. | 5 RF chains generate moderate power consumption and heat generation. |
| Baseband processing complexity | Consider system with 16 Aps and 5 UEs Each AP and UE are equipped with 100 antennas, 8 antennas, respectively. Antenna size (H matrix): 1600 × 40 | Same configuration, Antenna size (H matrix): 16 × 40 | a multiplexer connected to the plurality of antenna sets, for selectively activating an antenna set of the plurality of antenna sets, in order that a collimated beam is emitted through the lens from the activated antenna set, wherein the lens includes a Luneburg lens, and the plurality of antenna sets are located within the range of a circular cone with the center of the Luneburg lens as the vertex and with a cone angle of 90 degrees or less.

2. The lens antenna system according to claim 1, wherein the plurality of antenna sets are located on the surface of the lens.

3. The lens antenna system according to claim 1, further comprising:

an antenna processing unit (APU) connected to the multiplexer, for providing a signal to be handled by the activated antenna set and a signal for the selectively activating.

4. The lens antenna system according to claim 1, wherein the activated antenna set is selectively activated according to a direction or position of a User Equipment (UE).

5. The lens antenna system according to claim 1, wherein at least two of the plurality of antenna sets are selectively activated in a duplex approach, to provide service to a plurality of User Equipments (UEs).

6. The lens antenna system according to claim 1, wherein each of the plurality of antenna sets includes a pair of antenna elements with perpendicular polarization directions.

7. The lens antenna system according to claim 3, wherein the multiplexer includes a logic gate electronics including at least one digital switch, and wherein the multiplexer is integrated with the APU.

8. A sheet antenna system, comprising:

a sheet base;

a plurality of lens antenna systems on the sheet base in a mesh pattern;

a plurality of interconnects, each of the plurality of interconnects is used for connecting at least two of the plurality of lens antenna systems;

padding material for wrapping the plurality of lens antenna systems and the plurality of interconnects; and covering material, for covering the sheet base, the plurality of lens antenna systems, the plurality of interconnects, and the padding material, wherein at least one of the plurality of lens antenna systems includes a lens antenna system comprising:

a lens;

a plurality of antenna sets attached to the lens; and a multiplexer connected to the plurality of antenna sets, for selectively activating an antenna set of the plurality of antenna sets, in order that a collimated beam is emitted through the lens from the activated antenna set.

9. The sheet antenna system according to claim 8, further comprising:

at least one connector, connected to another sheet antenna system.

10. The sheet antenna system according to claim 8, further comprising:

at least one connector, connected to a power source.

11. The sheet antenna system according to claim 8, wherein each of the plurality of interconnects is used for providing synchronization, data transfer, and power supply for the lens antenna systems connected thereto.

12. The sheet antenna system according to claim 8, wherein the plurality of lens antenna systems are located in a two-dimensional array, and wherein the plurality of interconnects include a plurality of row interconnects for connecting a plurality of lens antenna systems in the same row respectively and a plurality of column interconnects for connecting a plurality of lens antenna systems in the same column respectively.

13. The sheet antenna system according to claim 8, wherein the sheet base comprises a flexible film.

14. The sheet antenna system according to claim 8, wherein a plurality of collimated beams are emitted respectively from at least two of the plurality of lens antenna systems in the sheet antenna system to a same User Equipment (UE).

15. The sheet antenna system according to claim 8, wherein the sheet antenna system forms a part of a distributed massive Multiple Input Multiple Output (MIMO) system.

16. A sheet antenna system, comprising:

a sheet base;

a plurality of lens antenna systems on the sheet base in a mesh pattern; and a plurality of interconnects, each of the plurality of interconnects is used for connecting at least two of the plurality of lens antenna systems, wherein at least one of the plurality of lens antenna systems includes a lens antenna system comprising:

a lens;

a plurality of antenna sets attached to the lens; and a multiplexer connected to the plurality of antenna sets, for selectively activating an antenna set of the plurality of antenna sets, in order that a collimated beam is emitted through the lens from the activated antenna set, wherein the plurality of lens antenna systems are located in a two-dimensional array; and wherein the plurality of interconnects include a plurality of row interconnects for connecting a plurality of lens antenna systems in the same row respectively and a plurality of column interconnects for connecting a plurality of lens antenna systems in the same column respectively.

* * * * *